No. 783,755. PATENTED FEB. 28, 1905.
J. McGRAW.
COMB.
APPLICATION FILED NOV. 19, 1904.
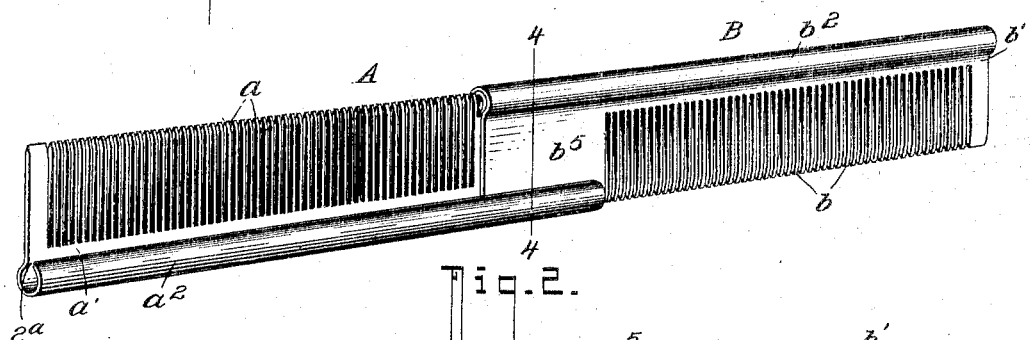
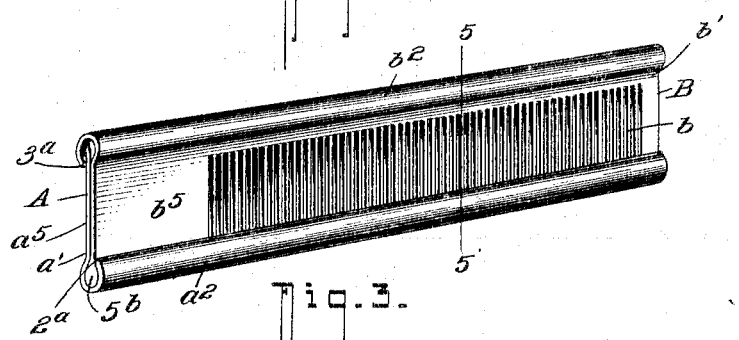
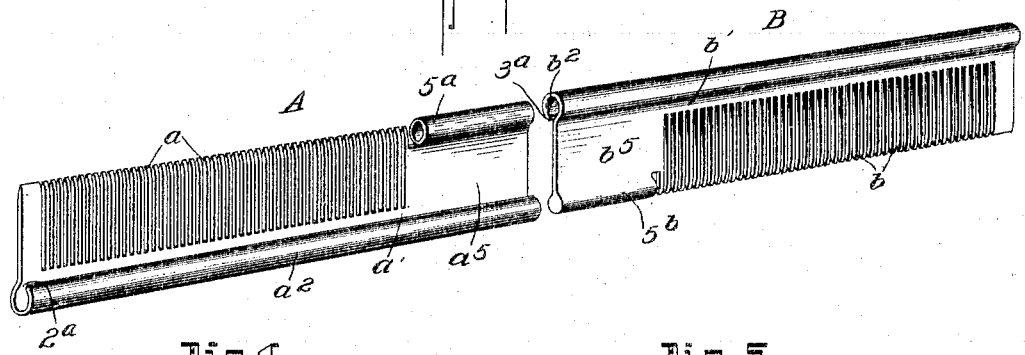
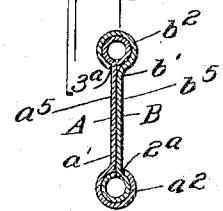
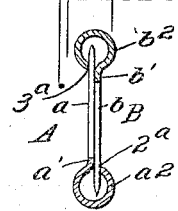
WITNESSES:
F. C. Gibson
John T. Schrott
INVENTOR
James McGraw.
BY
Fred G. Dieterich
ATTORNEYS No. 783,755. Patented February 28, 1905.

UNITED STATES PATENT OFFICE.

JAMES McGRAW, OF WEST ALMOND, NEW YORK.

COMB.

SPECIFICATION forming part of Letters Patent No. 783,755, dated February 28, 1905.

Application filed November 19, 1904. Serial No. 233,399.

*To all whom it may concern:*

Be it known that I, JAMES McGRAW, residing at West Almond, in the county of Allegany and State of New York, have invented a new and Improved Comb, of which the following is a specification.

My invention seeks to provide a simple, economical, and neat construction of comb which is more especially designed for use as a pocket-comb; and it comprehends, generically, a comb-body formed of a plurality of toothed sections slidably connected and so combined and coöperatively arranged that when adjusted to one position—that is, closed upon each other—the back edge of the several sections act as casings to receive the toothed ends of the opposing members, thereby forming, as it were, a casing for the comb-teeth, and the same will combine the two sections in such manner that they form a compact body capable of being readily carried in the pocket of the user without the slightest danger of tearing or otherwise mutilating the pocket or that of breaking the comb.

In its more complete nature my invention consists of a two-part comb having the back edge of each part made tubular and longitudinally slotted, whereby to telescopically receive the toothed ends of the aforesaid two parts, and having means for rigidly bracing the two parts, whereby to securely hold the two comb-sections at their extended or folded positions.

In its more subordinate features my invention consists of a foldable comb formed of two sections slidable upon each other and having a peculiar construction and arrangement of the several parts thereof, all of which will be fully described, pointed out in the claims, and illustrated in the accompanying drawings, in which—

Figure 1 is a perspective of my improved comb, the two parts being extended ready for use. Fig. 2 is a similar view of the said parts closed up. Fig. 3 is a perspective view of the comb members separated. Fig. 4 is a transverse section of the same on the line 4 4 of Fig. 1. Fig. 5 is a similar view thereof on the line 5 5 of Fig. 2.

In carrying out my invention I make my improved comb of two members A B, each of which is constructed alike, except that the teeth $b$ on the member B are finer than the teeth $a$ on the member A, whereby to provide a combined fine and coarse toothed comb.

In the practical construction of my invention the members A and B may be stamped of metal or made of tortoise-shell or any other material capable of being formed into the shape shown in the drawings.

The back $a'$ and $b'$ of the comb-sections are each in the nature of a tubular rib $a^2 b^2$, and the said tubular rib $a^2$ or $b^2$ extend the full length of the two comb-sections A and B, and at the lower edge thereof each of the tubular portions $a^2 b^2$ has a longitudinal slot $2^a 3^a$, the purpose of which will presently appear.

The toothed portion of each member A and B does not extend the full length of the said member, so as to leave one end of each of said members A and B solid, as at $a^5$ and $b^5$, and these portions form the interlocking ends of the two members A and B when they are extended, as shown in Fig. 1, by reference to which it will be observed that the two members A and B are disposed reversely with respect to each other, or, in other words, the teeth in the members A project in an opposite direction to the projection of the teeth on the member B, such relation of parts being provided that the ends of the teeth $a'$ enter the tubular back of the member B, while the teeth $b'$ likewise enter the tubular back of the part A when the two comb-sections are closed, as shown in Fig. 2.

The toothed edge of each of the members A and B at the solid ends $a^5$ and $b^5$ terminate in a rib $5^a 5^b$, which may be solid or tubular, preferably the latter when the comb-body is made of metal, and each of the ribs $5^a 5^b$ are of such diameter as to telescopically enter the tubular back rib $a^2 b^2$, the rib $5^a$ being arranged to slide into the back rib $b^2$, while the rib $5^b$ enters the back rib $a^2$, as shown.

By arranging the parts as shown a firm and rigid connection of the two members A and B is effected at the adjacent or overlapping portions thereof, and this produces a double comb of sufficient rigidity for all practical purposes, and when made of material other than metal it provides a strong and durable connection of the two parts.

From the foregoing description, taken in connection with the accompanying drawings, it is thought the advantages of my improvement will be readily apparent.

It will be noticed the same is in the nature of a double comb and a casing for receiving the toothed ends of the opposing sections, and at the same time the parts can be contracted to form a small package that can be readily carried in the pocket.

Another advantage of my invention is that the two parts of the comb can be separated and each used independently of the other as a single comb as the user may desire.

Having thus described my invention, what I claim, and desire to secure by Letters Patent, is—

1. A comb composed of two sections, endwise slidably mounted upon each other with the toothed edges projected in opposite directions, each section having a guard portion to receive the toothed ends of the opposing sections, when the two sections are closed upon each other.

2. A comb comprising a plurality of sections endwise slidably mounted upon each other with their toothed edges projected in opposite directions, the two sections having portions that telescopically engage, for the purposes specified.

3. A comb consisting of two members each of which has tubular back ribs forming guards, and each of which having supplemental tubular portions, the supplemental tubular portions of one member telescopically sliding in the tubular back rib of the other member, substantially as shown and described.

4. A comb consisting of two toothed sections each section having a longitudinal back rib, and each section provided with an interlocking extension having a supplemental rib, said sections telescopically slidable from end to end with the supplemental rib of one section in the longitudinal rib of the other section, substantially as shown and described.

5. A comb which consists of two members each of which has a back rib that extends the full length and teeth that extend nearly the full length, the solid end of each section having a longitudinal rib in line with the toothed edge, the several ribs of the two opposing members being arranged to telescopically interlock, substantially as shown and for the purposes described.

6. In a comb of the character described, the combination with the toothed member A having a tubular back rib and a tubular portion at the opposite edge in line with the ends of the comb-teeth; of the toothed member B having a back rib, and a toothed edge rib, said back and toothed edge ribs being adapted to telescopically engage with the tubular ribs on the other section A, substantially as shown and described.

7. In a comb of the character described, the combination with the toothed member A having a tubular back rib and a tubular portion at the opposite edge in line with the ends of the comb-teeth; of the toothed member B having a back rib and a toothed edge rib, said back and toothed edge rib being adapted to telescopically engage with the tubular ribs on the other section A, the teeth of the toothed members A and B extending in opposite directions, substantially as shown and described.

JAMES McGRAW.

Witnesses:
   D. D. DICKSON,
   JOHN WAFLER.